(12) United States Patent
Akaba et al.

(10) Patent No.: US 6,340,226 B1
(45) Date of Patent: Jan. 22, 2002

(54) SPECTACLES ACCOMMODATING INTERCHANGEABLE/REPLACEABLE LENS

(75) Inventors: Toshihisa Akaba; Kazumichi Kurihara; Yasushi Sakai; Hakaru Fujita; Youichi Ishiguro; Isao Iizuka; Yukihiro Izumitani, all of Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/701,683

(22) PCT Filed: Apr. 26, 2000

(86) PCT No.: PCT/JP00/02718
§ 371 Date: Dec. 1, 2000
§ 102(e) Date: Dec. 1, 2000

(87) PCT Pub. No.: WO00/67066
PCT Pub. Date: Nov. 9, 2000

(30) Foreign Application Priority Data

Apr. 30, 1999 (JP) ............................................. 11-124995

(51) Int. Cl.⁷ .............................. G02C 1/04; G02C 1/08
(52) U.S. Cl. ........................................ 351/106; 351/103
(58) Field of Search ................................ 351/103, 104, 351/105, 106, 107, 108, 109

(56) References Cited

U.S. PATENT DOCUMENTS 2,653,513 A * 9/1953 Martin ........................ 351/109
5,646,706 A 7/1997 Izumitani

FOREIGN PATENT DOCUMENTS

| EP | 0 718 660 A1 | 6/1996 |
|---|---|---|
| JP | 52-139103 | 10/1977 |
| JP | 54-68638 | 6/1979 |
| JP | 58-23309 | 2/1983 |
| JP | 58-65015 | 5/1983 |
| JP | 58-88623 | 6/1983 |
| JP | 58-100314 | 7/1983 |
| JP | 58-111054 | 7/1983 |
| JP | 58-115717 | 8/1983 |
| JP | 58-195219 | 12/1983 |
| JP | 60-21716 | 2/1985 |
| JP | A 7-230062 | 8/1995 |

* cited by examiner

*Primary Examiner*—Hung Xuan Dang
(74) *Attorney, Agent, or Firm*—Oliff & Berridge, PLC

(57) ABSTRACT

The present invention provides spectacles for which lens replacement is simple, and replacement lens portability is excellent, and which is capable of reliably mounting and fastening a lens to a frame without a risk of damaging a lens. The present invention has a lens-side-connecting member 3 for mounting lens 2 detachably to a frame portion 1, which is constituted by a member separate from lens 2 and is fixed to the edge portion of the lens 2, and a frame-side-connecting member 120, which is disposed on the above-mentioned frame portion 1 for mounting the above-mentioned lens 2 detachably to the above-mentioned frame portion 1 by connecting the same detachably to the above-mentioned lens-side-connecting member 3.

9 Claims, 12 Drawing Sheets

FIG.7 A
FIG.7 B
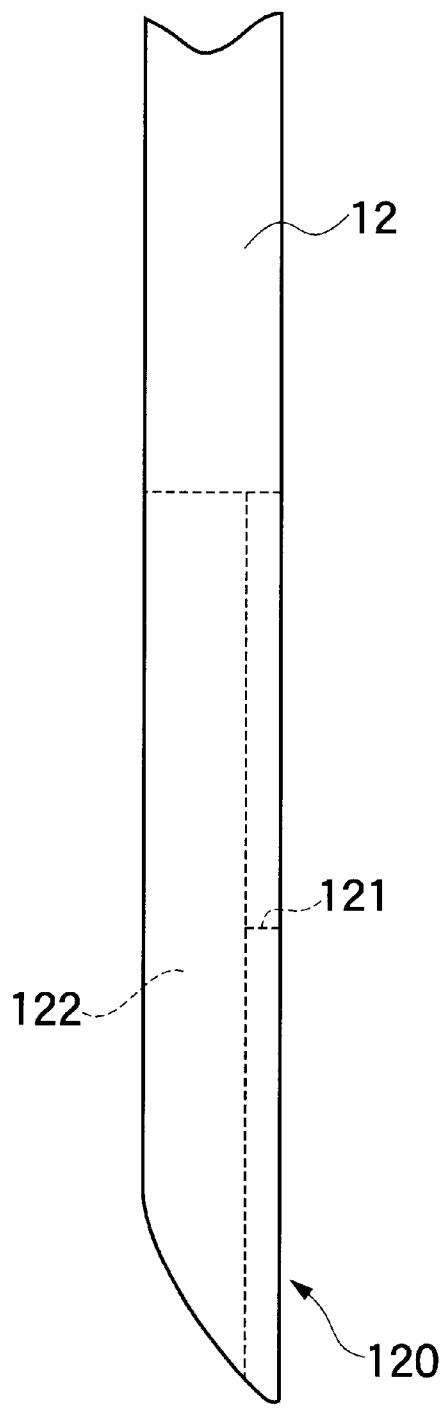
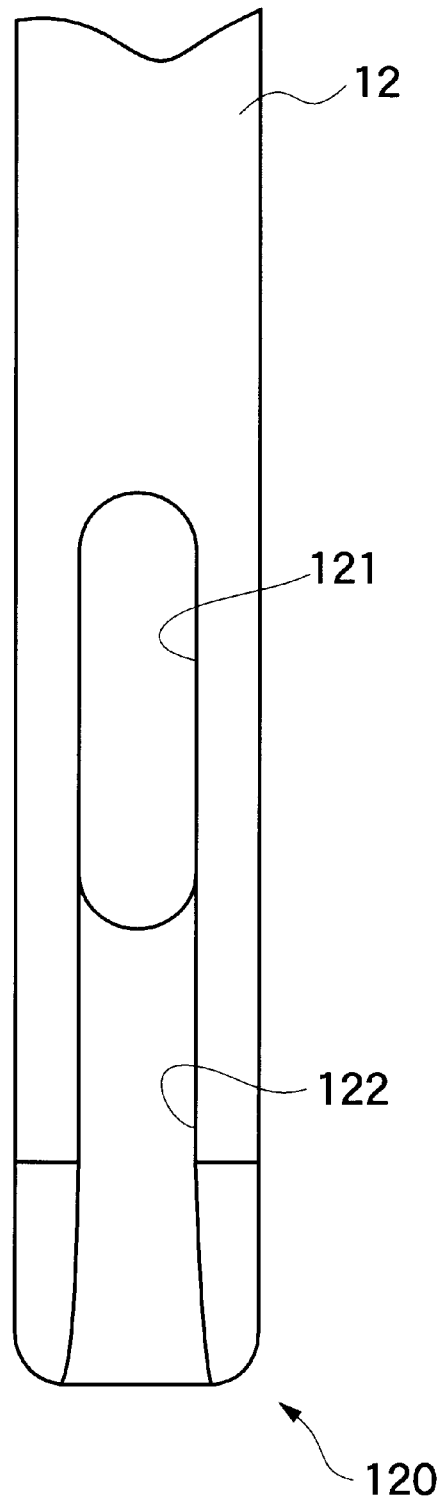

FIG.8 A
FIG.8 B
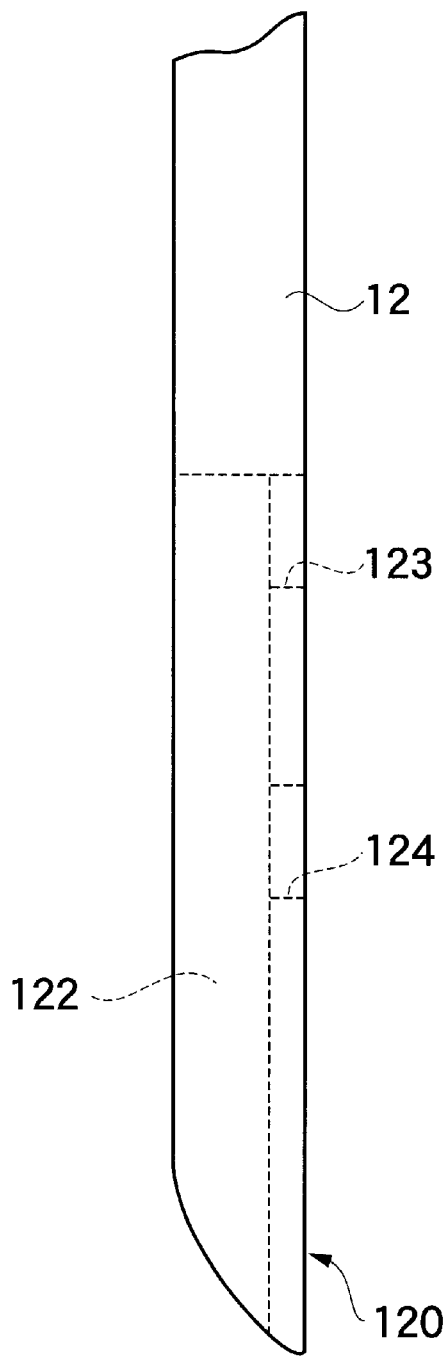
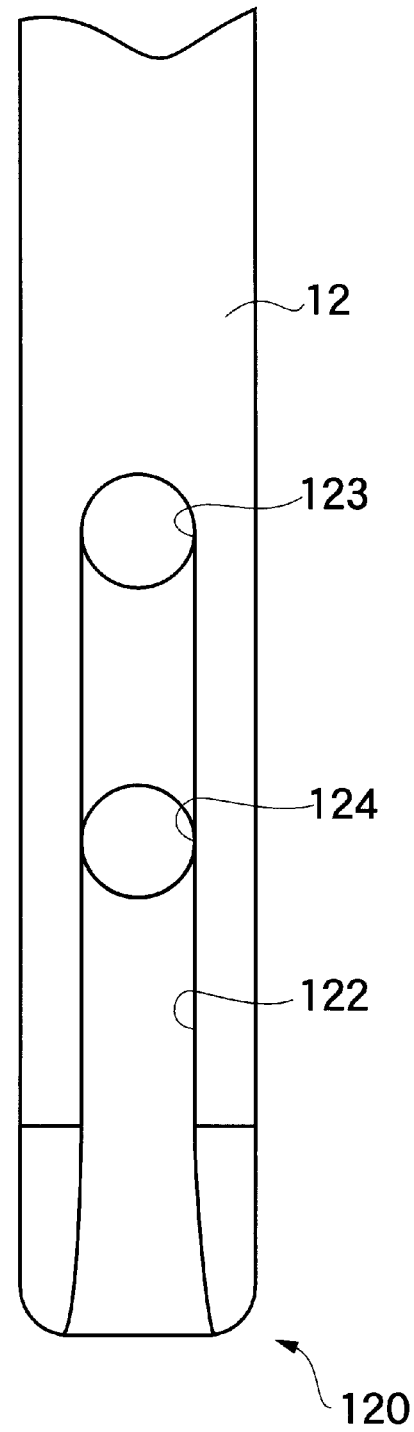

SPECTACLES ACCOMMODATING INTERCHANGEABLE/REPLACEABLE LENS

TECHNICAL FIELD

The present invention relates to spectacles, which enable a spectacles user to replace a lens without changing a frame, and to replace a frame without changing a lens.

BACKGROUND ART

As for ordinary spectacles, spectacle lenses are firmly fastened to a spectacle frame. For example, in the so-called metal frame type of form, in which a rim is fitted to the entire circumference of a lens edge, after fitting the rim to a lens edge, the lens is fastened by tightening such that the diameter of the rim becomes smaller. Since the tightened fastening thereof is performed by using a special tool to tighten a special screw disposed on a rim, a wearer cannot easily perform this fastening.

Further, because a special tool and technique is required for a type of spectacles, which is constituted such that only the area of about the upper half of a lens edge is fitted to a rim, and the bottom half of a lens edge is held by a nylon thread or the like, a wearer cannot easily perform this fastening.

Furthermore, because the so-called three-piece type of form, in which parts, such as a bridge and a temple are fastened directly to a lens without using a rim, also requires a special tool technique to mount the above-mentioned parts to a lens, a wearer cannot easily perform this fastening process either.

Incidentally, from the standpoint of a person, who requires spectacles, it is rather unusual for one pair of spectacles to serve all intended uses. For example, in the case of a presbyopic person, who wants to ensure vision from far to near, a progressive refractive power lens, or a bifocal or trifocal lens (a lens for both near and far use) is utilized. However, although a lens such as this is capable of ensuring far and near vision with a one pair of spectacles, it is not always sufficient due to phenomena such as image distortion at the lens periphery, and a "narrow range of vision."

In a case such as this, in addition to spectacles mounted with a "lens that enables vision from far to near," spectacles that mount in the frame in accordance with the needs of a wearer specialized lenses with narrow applications, such as "a specialized lens for far use." "a specialized lens for near use," and "a lens for intermediate use" are made, and these are used together Further, this approach is not only for cases in which lenses of different strength design are used to best advantage, but rather is also used in the case of, for example, simple near vision and far vision, and even if non-tinted lenses are mounted ordinarily, in cases in which spectacles are used as sunglasses by mounting dark color lenses when driving, for example, or using spectacles for fishing by mounting polarized lenses.

In cases such as these, too, spectacles, which was mounted with a lens equipped with a respective function, such as "a dark color lens", "a polarized lens," and the like, had to be made separately, and this lens had to be substituted in accordance with the needs of a wearer. However, making and carrying around a plurality of spectacles in this manner lacked portability, and further, required a plurality of spectacle frames, and was not economical.

To solve for problems such as those mentioned above, for some time now there have been several proposals for spectacles, which are constituted such that a wearer can replace on his own a variety of spectacle lenses relative to a single spectacle frame. The following spectacles. are known as such conventional spectacles.

(1) Spectacles of a type, which mounts a lens in a replaceable condition by disposing at a number of locations on the circumference of a rim holding pieces for nipping and holding a lens edge (Refer to Japanese Utility Model Application Laid-open Nos. 58-23309, 58-88623, 58-100314, and 58-195219).

(2) spectacles of a type, which mounts a lens n a replaceable condition by clasping a lens upper portion from the opposite sides using the elasticity of a frame (Refer to Japanese Utility Model Application Laid-open Nos. 54-68638, and 58-65015).

(3) Spectacles constituted such that left and right lenses fitted into respective left and right rims linked by a bridge are mounted in a replaceable condition to a frame main body, to which left and right temples (spectacle bows) are mounted (Refer to Japanese Utility Model Application Laid-open No. 58-115717).

However, the above-mentioned conventional spectacles (1)–(3) had the following disadvantages. That is, in spectacles of type (1) above, a lens edge is nipped and held by a holding piece. As for this holding piece, because the spacing of the portion into which a lens edge is fitted is fixed, in a case where the thickness of the edge of a lens differs between a pre-replacement lens, and a post-replacement lens, play may be generated so that it may be impossible to hold the lens securely and in some cases even to hold it at all.

In spectacles of type (2) above, because a lens is clasped from the opposite sides by pressing the frame directly to the sides of the edge portion of the lens, holding cannot always be certain, and furthermore, there is also the danger of a lens being damaged by holding.

Furthermore, in spectacles of type (3) above, left and right lenses are fitted into respective left and right rims linked by a bridge are replaced. Although the object into which these lenses are fitted does not have a temple portion, because the completed spectacles have practically the same width thereas, the disadvantages are a lack of portability, and there is little difference with carrying around a plurality of spectacles.

With the foregoing in view, it is an object of the present invention to provide spectacles for which leas replacement is simple, and replacement lens portability is excellent, and which is capable of securely fastening a lens to a frame without damaging a lens.

DISCLOSURE OF THE INVENTION

To solve for the above-mentioned problems, a first invention is spectacles comprising a frame portion; a lens mounted to this frame portion; a lens-side-connecting member for mounting the above-mentioned lens detachably to the above-mentioned frame portion, which is constituted by a member separate from the above-mentioned lens and is fixed to an edge portion of this lens; and, a frame-side-connecting member which is disposed on the above-mentioned frame portion so as to be connected detachably to the above-mentioned lens-side-connecting member for mounting the above-mentioned lens detachably to the above-mentioned frame portion.

A second invention is spectacles related to the first invention, characterized in that the above-mentioned lensside-connecting member is mounted to the side face of above-mentioned lens edge portion, and is formed so as to protrude from this side face, and the above-mentioned frame-side-connecting member has a fitting portion into which the above-mentioned lens-side-connecting member is fitted detachably.

A third invention is spectacles related to the second invention, characterized in that a cavity portion is formed in the side face of the above-mentioned lens edge portion such that a portion of the above-mentioned lens-side-connecting member is fitted and fixed in the cavity portion, and the above-mentioned lens-side-connecting member has a protruding portion for fitting into the cavity portion provided in the above-mentioned lens edge portion.

A fourth invention is spectacles related to the first invention, characterized in that the above-mentioned lens-side-connecting member is fastened to the above-mentioned lens edge portion by a mechanical fastener.

A fifth invention is spectacles related to the fourth invention, characterized in that the above-mentioned mechanical fastener comprises a screw passing through the above-mentioned lens edge portion and a portion of the above-mentioned lens-side-connecting member, and a nut for fastening the above-mentioned lens-side-connecting member to the above-mentioned lens edge portion by being screwed onto this screw.

A sixth invention is spectacles related to the third invention, characterized In that the above-mentioned lens-side-connecting member is bonded and fixed with the protruding portion thereof being fitted into the cavity portion provided in the side face of the above-mentioned lens edge portion.

A seventh invention is spectacles related to the first invention, characterized in that the above-mentioned frame portion comprises a front bar having left and right temples mounted to the left and right ends thereof, respectively, and a lens-fastening bar to which the above-mentioned left and right lenses are attached in a replaceable condition; the above-mentioned lens-fastening bar being fixed to the above-mentioned front bar.

An eighth invention is spectacles related to the seventh invention, characterized in that the above-mentioned lens-fastening bar is provided with a fitting portion to which the above-mentioned lens-side-connecting member is fitted detachably.

A ninth Invention is spectacles related to the eighth invention, characterized in that the above-mentioned lens-fastening bar is composed of a member having elasticity, has contours conforming to the side face of the above-mentioned lens edge portion, and is constituted so as to clasp the side face of the lens edge portion by elastic force from the opposite sides.

BRIEF DESCRIPTION OF THE DRAWINGS

FIG. 7A and FIG. 7B are diagrams showing a frame-side-connecting member;

FIG. 8A and FIG. 8B are diagrams showing a frame-side-connecting member;

BEST MODE FOR CARRYING OUT THE INVENTION

Figure 1:
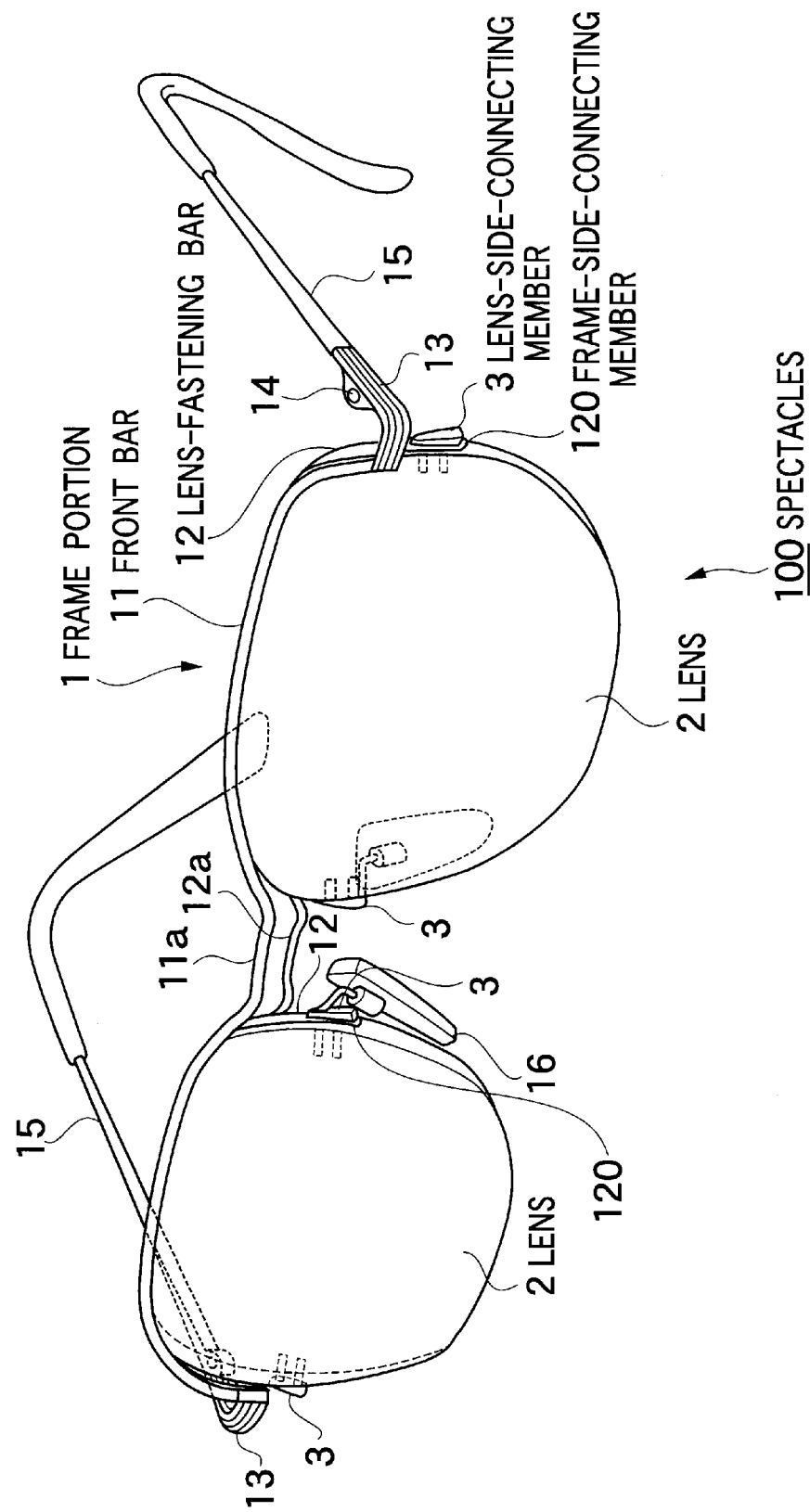
FIG. 1 is an oblique view of spectacles related to an aspect of the embodiment of the present invention.
Figure 2:
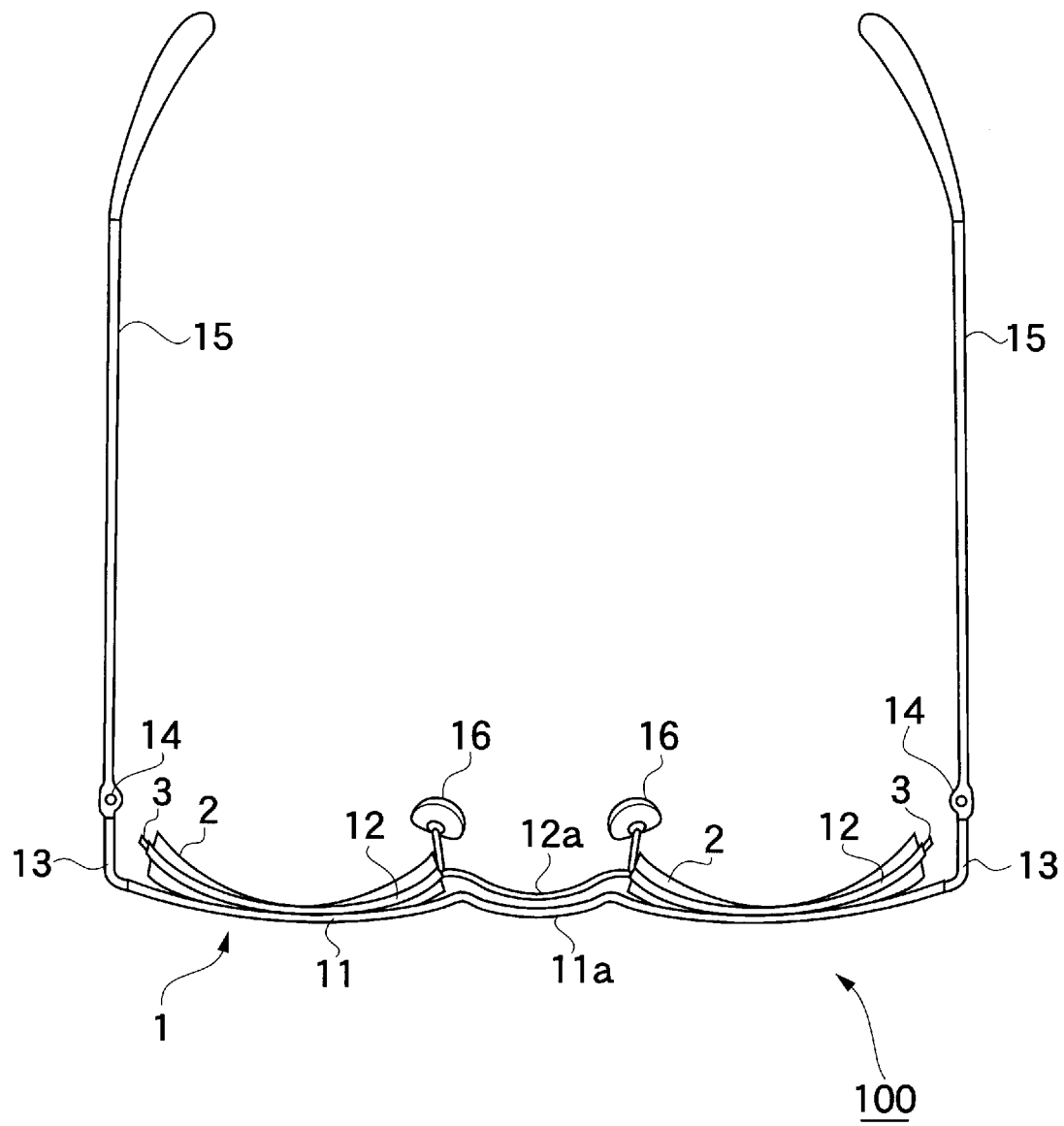
FIG. 2 is a plan view of spectacles related to an aspect of the embodiment of the present invention.
Figure 3:
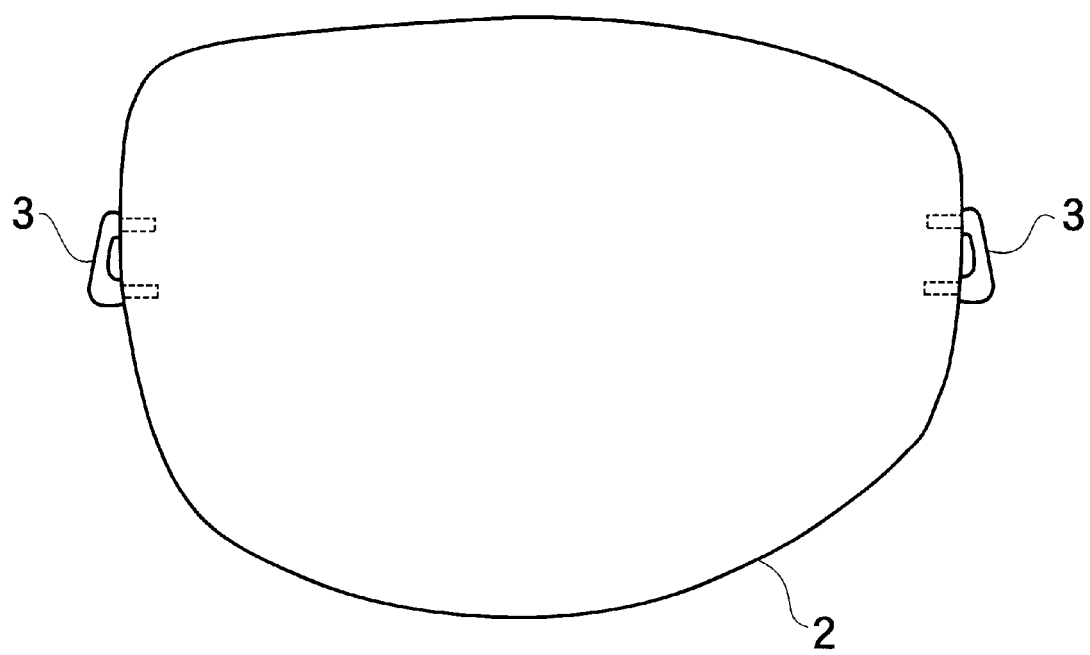
FIG. 3 is a diagram showing a lens to which lens-side-connecting members are fixed.
Figure 4:
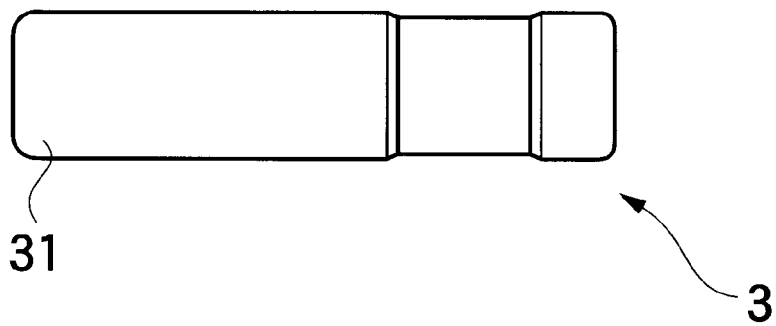
FIG. 4A and FIG. 4B are diagrams showing a lens-side-connecting member.
Figure 4:
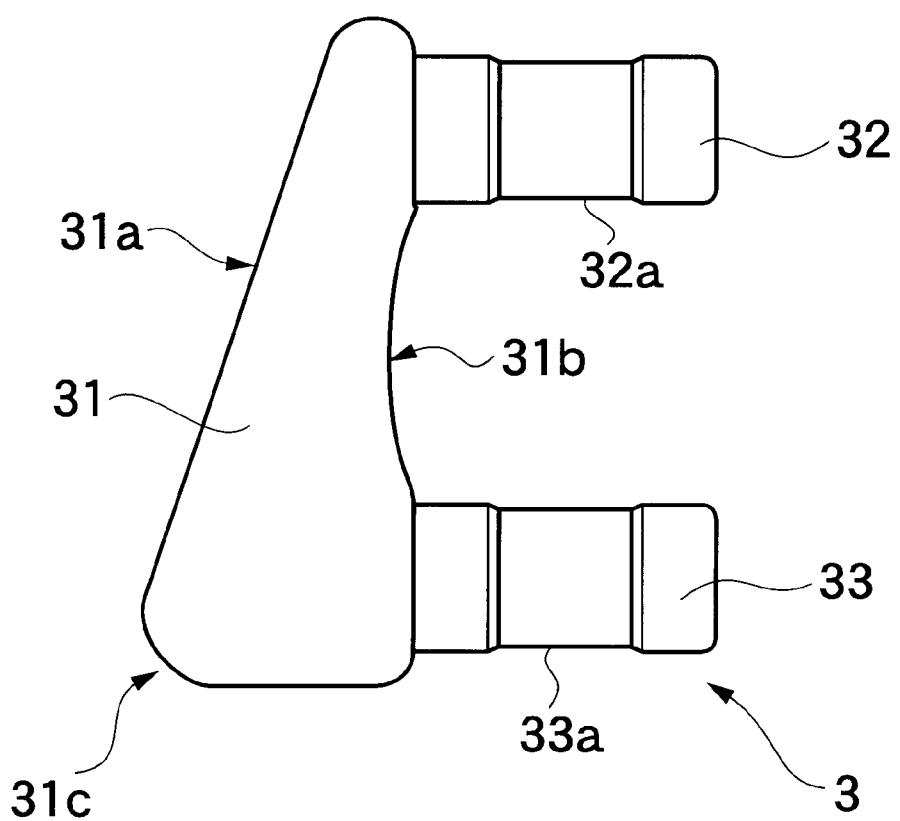
Figure 5:
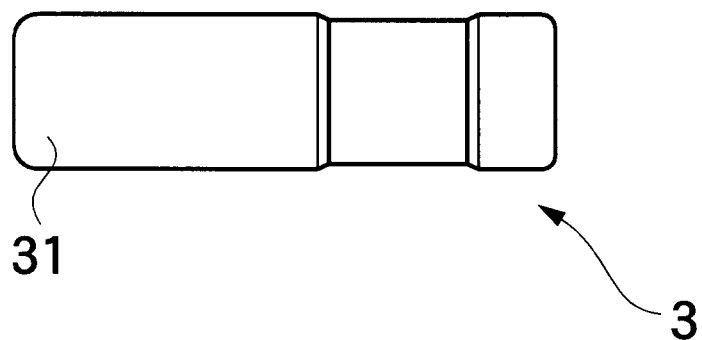
Fig. 5A and FIG. 5B are diagrams showing a lens-side-connecting member.
Figure 5:
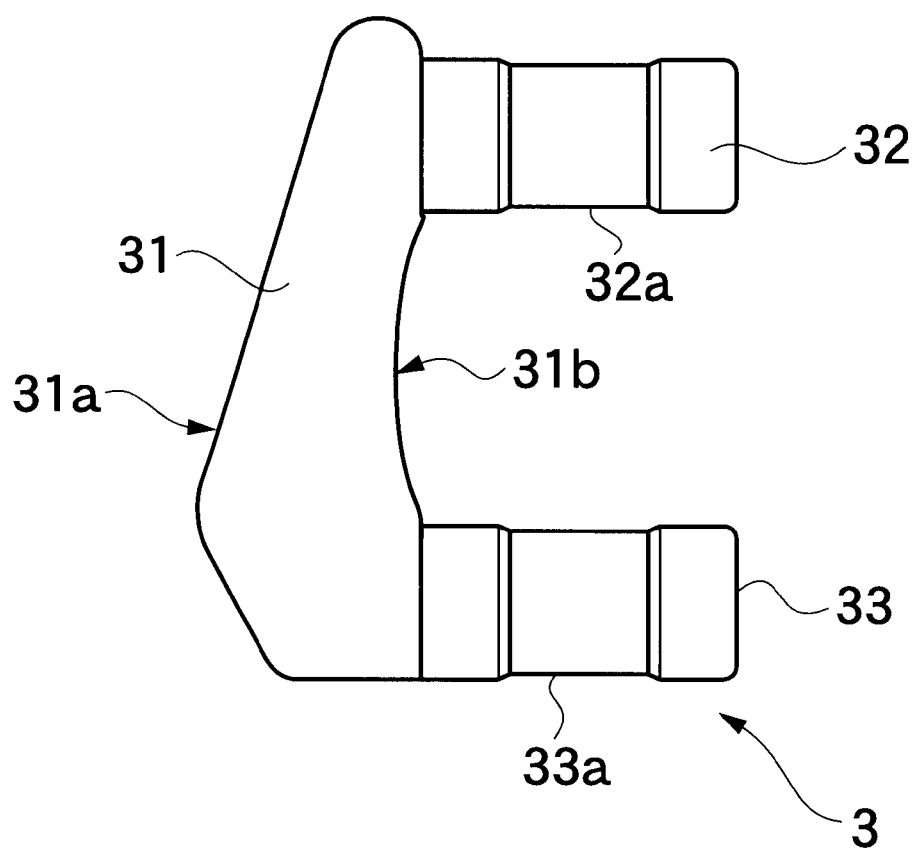
Figure 6:
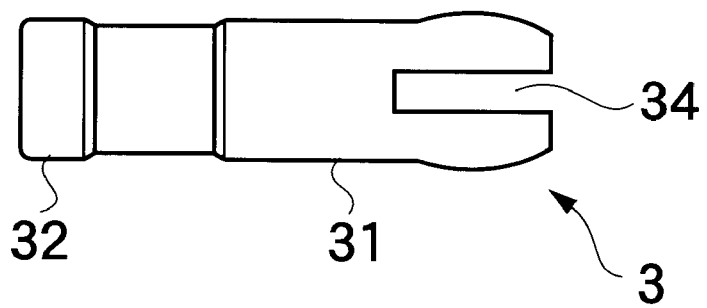
FIG. 6A and FIG. 6B are diagrams showing a lens-side-connecting member.
Figure 6:
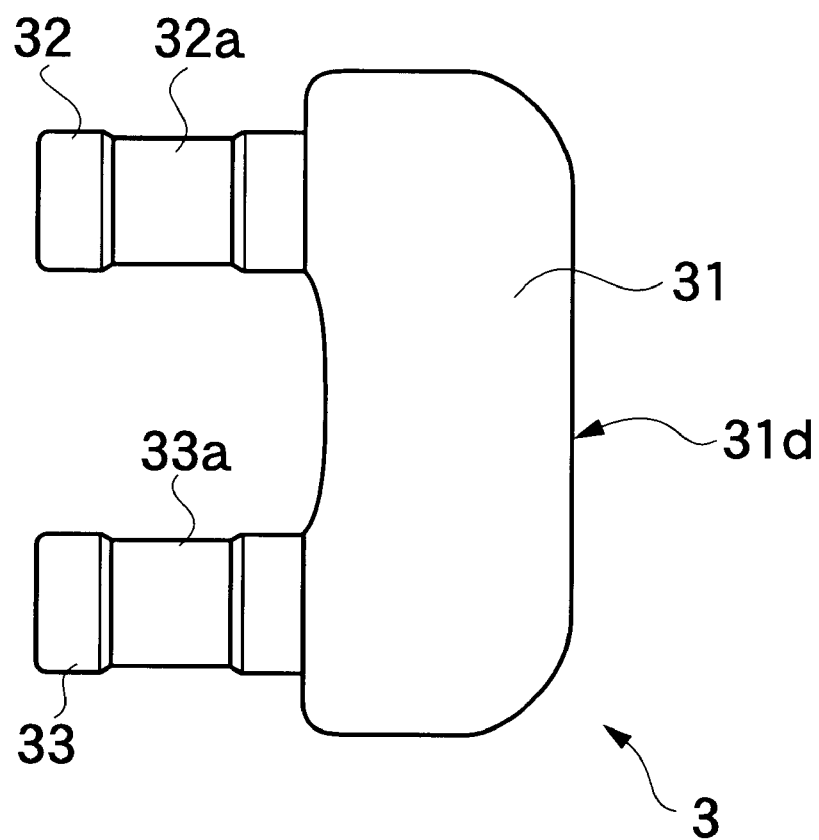
Figure 9:
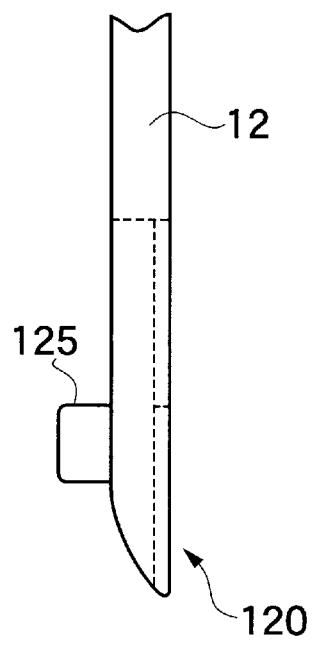
FIG. 9A and FIG. 9B are diagrams showing a frame-side-connecting member.
Figure 9:
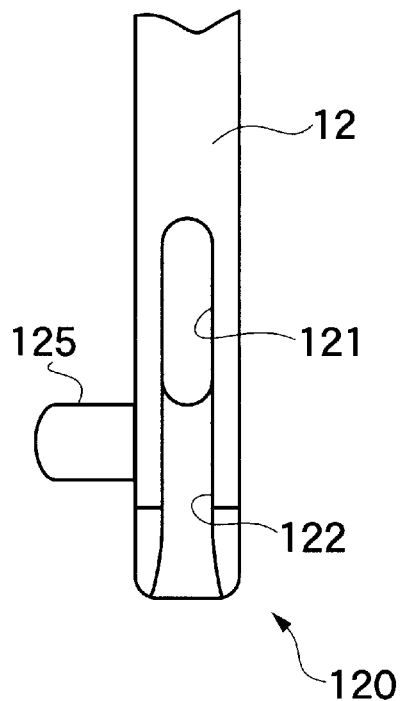
Figure 10:
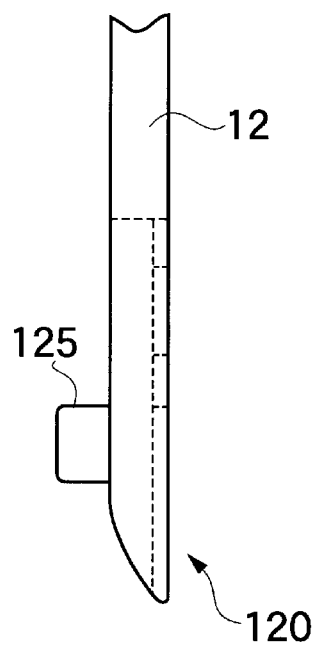
FIG. 10A and FIG. 10B are diagrams showing, a frame-side-connecting member.
Figure 10:
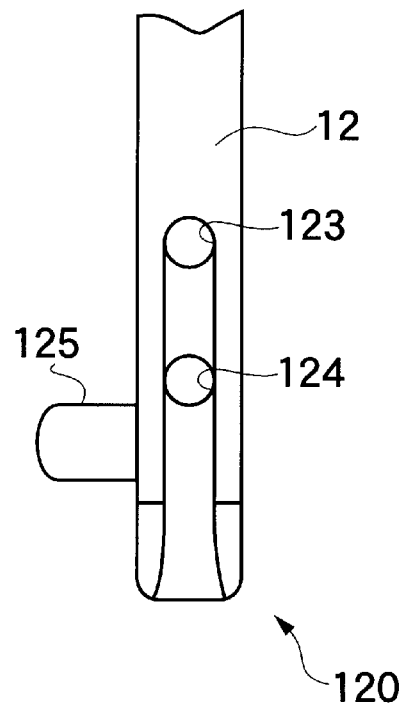

FIG. 1 is an oblique view of spectacles related to an aspect of the embodiment of the present invention, FIG. 2 is a plan view of spectacles related to an aspect of the embodiment of the present invention. FIG. 3 is a diagram showing a lens to which lens-side-connecting members are mounted in a fixed condition, FIG. 4A–FIG. 6B are diagrams showing lens-side-connecting members, and FIG. 7A–FIG. 10B are diagrams showing frame-side-connecting members. Spectacles related to aspects of the embodiment of the present invention will be explained hereinbelow while referring to these figures.

In the figures, spectacles 100 has a frame portion 1, and lenses 2, which are mounted in a replaceable condition to this frame portion. Frame portion 1 has its main constituent parts a front bar 11, which constitutes the main framework of the frame portion, a lens-fastening bar 12, which is mounted in a fixed condition to this front bar 11, and to which is mounted in a replaceable condition left and right lenses, and temples 15, which are joined at both the left and right end portions of the front bar 11. Furthermore, herein "front bar 11" is used as a concept (a generic term for these parts), which includes all the spectacle parts that are stipulated by terms such as brow bar A, brow bar B, and rim bar In the Japanese Industrial Standards (JIS).

Front bar 11 is a cylinder-shaped body, which is constituted of nickel alloy, titanium, or other metal, or a high strength plastic or the like, is given a suitable curved shape so as to approximately conform to the upper portion shape of a lens, and forms a bridge portion 11a at the center portion. To the left and right end portions of this front bar 11 there are fixed end pieces 13, and temples 15 are mounted to these end pieces 13 by way of hinges 14.

Lens-fastening bars 12 are bonded to the opposite sides of bridge portion 11a of front bar 11. Lens-fastening bar 12 is constituted such that it is constituted from a member that has elasticity, is formed into a shape conforming to the side face of the upper edge portion of the left and right lenses 2, and is constituted so as to clamp the upper side edge of these lenses 2 by elastic force from the opposite sides. Bonding of lens-fastening bars 12 to front bar 11 is performed either at one location or at a plurality of locations, but the bonding location thereof is selected so as not to impede the elastic deformation of lens-fastening bar 12.

Left and right lens-fastening bars 12 are joined by bridge portion 12a, whereby the proximity of the above-mentioned bridge portion 12a of lens-fastening bar 12 has relatively high rigidity. Therefore, as will be explained hereinbelow, when a lens is replaced, this portion, which has relatively high rigidity, is held and the portion of the opposite side, which has high elasticity, is caused to deform to a greater extent. Further, frame-side-connecting member 120, which will be explained hereinbelow, is formed at both end portions of these lens-fastening bars 12. Further, nose pad 16 is attached to the end portion of the nose side of lens-fastening bar 12.

As the material for lens-fastening bar 12, for example, a white metal spring material, beryllium copper, phosphor bronze, titanium superelastic alloy, or titanium shape memory alloy are desirable. Naturally, a high-strength plastic or other resin is also useful.

Furthermore, in this aspect of the embodiment, there was given an example in which left and right lens-fastening bars 12 are joined by a bridge portion 12a, but a bridge portion 12a does not necessarily have to be provided. This is because there are cases in which such an approach is desirable from a design standpoint. In these cases, it is desirable to either increase the bonding locations of a lens-fastening bar 12 to a front bar 11, or to bond the nose side more strongly (for example, by soldering) to give the nose side rigidity.

As shown in FIG. 3, a lens-side-connecting member 3 is mounted in a fixed condition to the edge portion side face of both sides of a lens 2. As shown in FIG. 4A and FIG. 4B, a lens-side-connecting member 3 comprises plate portion 31, which constitutes the connecting portion, and 2 fastening pins 32 and 33, which are fastened to this plate portion 31. Plate portion 31 forms a plate-shaped body into an approximately right-angled triangular shape, forming a shape such that each vertex portion is rounded. When a lens-side-connecting member 3 is mounted in a fixed condition to a lens, side 31a of plate portion 31, which faces outwardly, constitutes a sloped portion. Further, side 31b of plate portion 31, which faces the lens side when a lens-side-connecting member 3 is fastened to a lens, forms an arch shape. That is, this lens-side-connecting member 3 is constituted such that when same is mounted in a fixed condition to a lens, the extent of protrusion of the protruding portion increases downwardly. In accordance therewith, when mounting a lens to a frame, the lens mounts easily, and the connection becomes difficult to break in the mounted state.

Lens-side-connecting member 3 is bonded and fixed by providing cavity portions (fastening holes) in the left and right side faces of lens 2 such that the above-mentioned fastening pins 32, 33 can be inserted therein, and by inserting the fastening pins 32, 33 into these cavity portions.

Fastening pins 32 and 33 are provided at the center portion in the longitudinal direction, with small diameter portions 32a and 33a, respectively, the diameters of which are slightly smaller than other parts of the fastening pins 32, 33. This small diameter portion ensures fastening pins 32, 33 to be fixed securely, and prevents these pins from coming out when inserted into lens cavity portions and mounted in a fixed condition by bonding or the like.

Furthermore, in a lens-side-connecting member 3, as shown in FIG. 5A and FIG. 5B, side face 31a of the sloped portion can be a reverse gradient slope 31c just before the bottom end thereof. According thereto, a disconnecting operation becomes easy. Further, an a lens-side-connecting member 3, as shown in FIG. 6A and FIG. 6B, the sloped portion can be done away with, and the side 31d made flat, and instead, converted to a half-split type by disposing a groove 34 vertically in the side of the plate 31, providing bulges on the front and back sides, and enabling a sure connection using elastic force. Furthermore, this half-split form can, as a matter of course, also be applied to the lens-side-connecting member 3 shown in FIG. 4A and FIG. 4B above. According thereto, a more solid connection becomes possible.

As a lens-side-connecting member 3, which is mounted to a lens 2, the sane member can be mounted to both sides of a lens, or different members can be mounted. For example, at lens replacement, if the easy-to-remove member shown in FIG. 5A and FIG. 5B is mounted to the side on which the connection that is detached first, and the hard-to-remove member shown in FIG. 4A and FIG. 4B is mounted on the other side, dismounting will be easy, and a replacement operation will become easy.

As the material for a lens-side-connecting member 3 a white metal, Hi nickel, titanium or other such material ordinarily used in a spectacle frame is good, but using a high-strength transparent plastic, such an a polycarbonate, acrylic, or nylon will enable low cast manufacture, and is esthetically preferable.

A frame-side-connecting member 120, as shown in FIG. 7A and FIG. 7B, is formed on both end portions of lens-fastening bar 12. This frame-side-connecting member 120 is constituted from a fastening hole 121, which is a long hole formed in a location that is a prescribed distance longitudinally upward from the bottom end portion of lens-fastening bar 12, and a groove portion 122, which is formed from the above-mentioned bottom end portion to fastening hole 121. Furthermore, the bottom end portion of frame-side-connecting member 120 (bottom end portion of lens-fastening bar 12) is formed in a tapered shape, and is constituted such that the tip is rounded.

Figure 11:
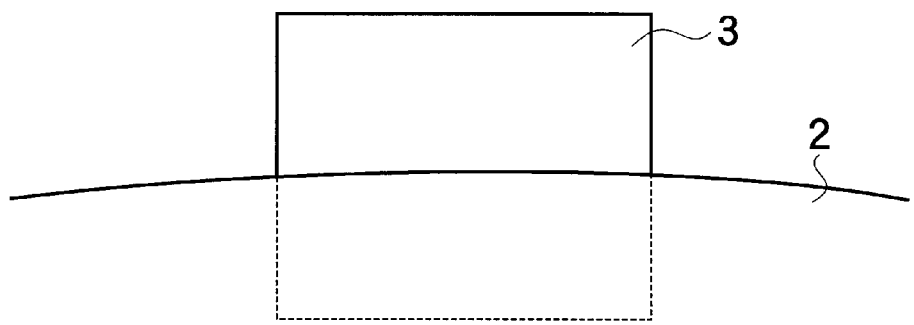
FIG. 11 is a di-gram showing a lens-side-connecting member.
Figure 12:
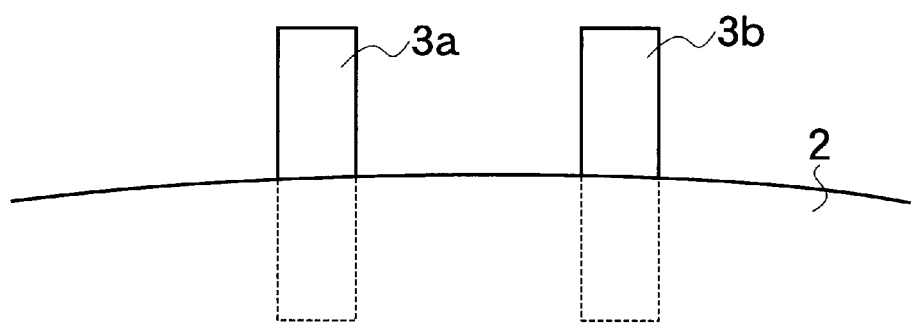
FIG. 12 is a diagram showing a lens-side-connecting member.
Figure 13:
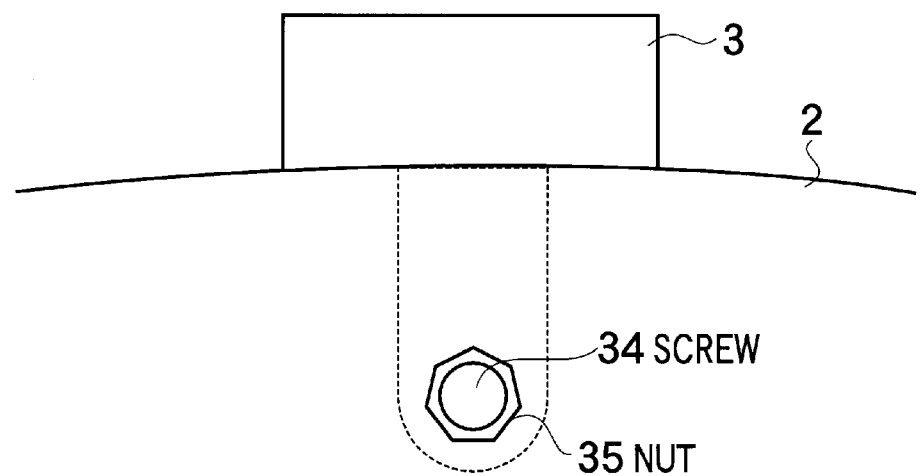
FIG. 13 is a diagram showing a lens-side-connecting member.

By fitting plate portion 31 of lens-side-connecting member 3 into fastening hole 121 of the above-mentioned frame-side-connecting member 120, the connection of both members is effected. Furthermore, the structure of frame-side-connecting member 120 is, of course, determined in line with the structure and type of lens-side-connecting member 3. For example, in a case in which lens-side-connecting member 3 is a simple plate-shape member, such as shown in FIG. 11 and FIG. 13, a long hole capable of mating thereto is good. However, in a case in which lens-side-connecting member 3 is constituted from 2 pins 3a, 3b as shown in FIG. 12, as shown in FIG. 8A and FIG. 8B, instead of a long hole, 2 fastening holes 123 and 124 corresponding to the above-mentioned pins are provided. In other words, as long as both connecting members can be connected securely without play, then any kind of member can be used. For example, the above-mentioned holes were all through holes, but these holes do not always have to be through holes.

Furthermore, a portion of the lens-side-connecting members shown in FIG. 11 and FIG. 12 is fitted into a cavity or hole disposed in a lens 2, and mounted in a fixed condition by bonding, but the example shown in FIG. 13 is constituted such that a lens-side-connecting member 3 is also firmly fastened mechanically using a nut and a screw 35 that passes through the lens from front to back, and passes through the lens-side-connecting member 3.

Figure 14:
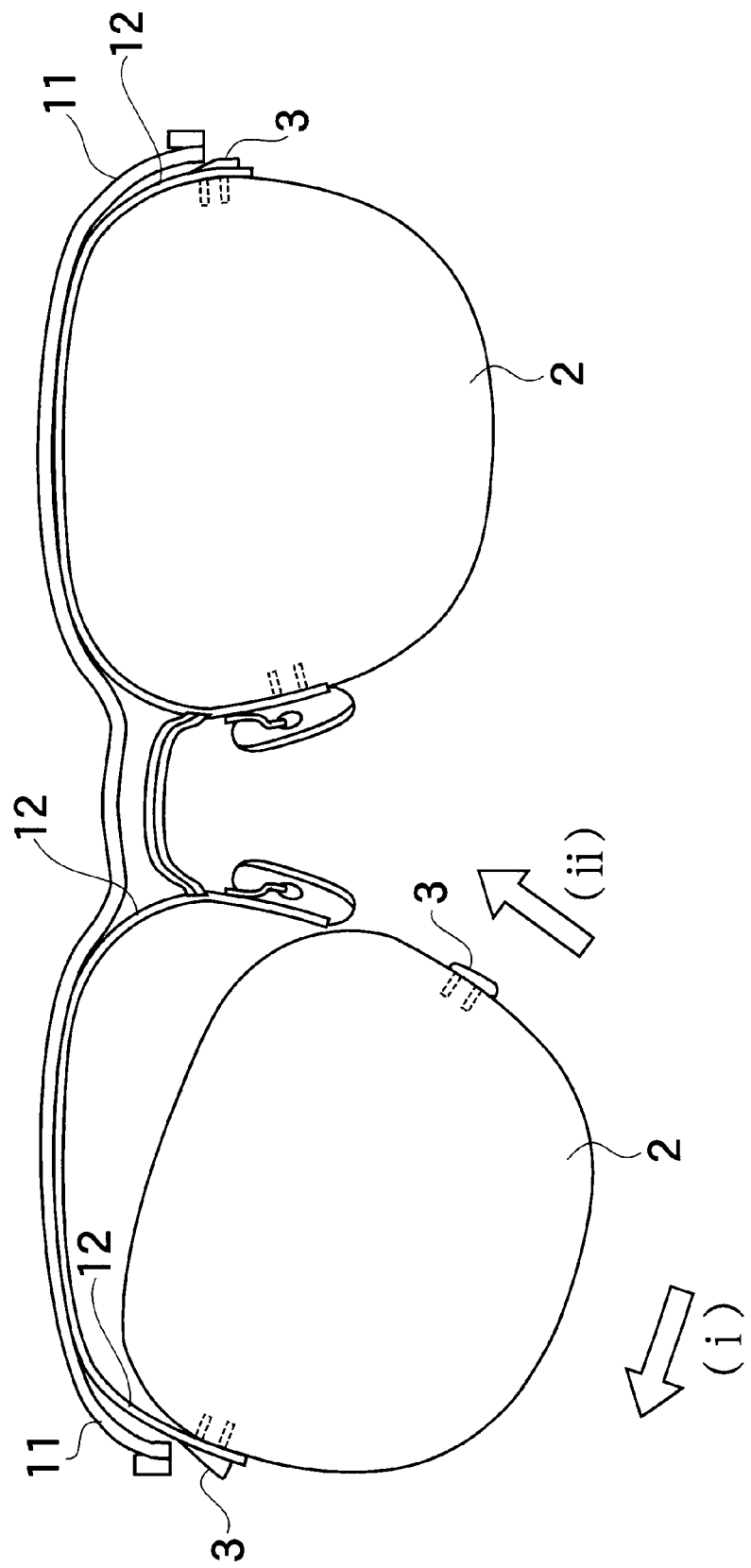
FIG. 14 is an illustration of a lens replacement procedure.
Figure 15:
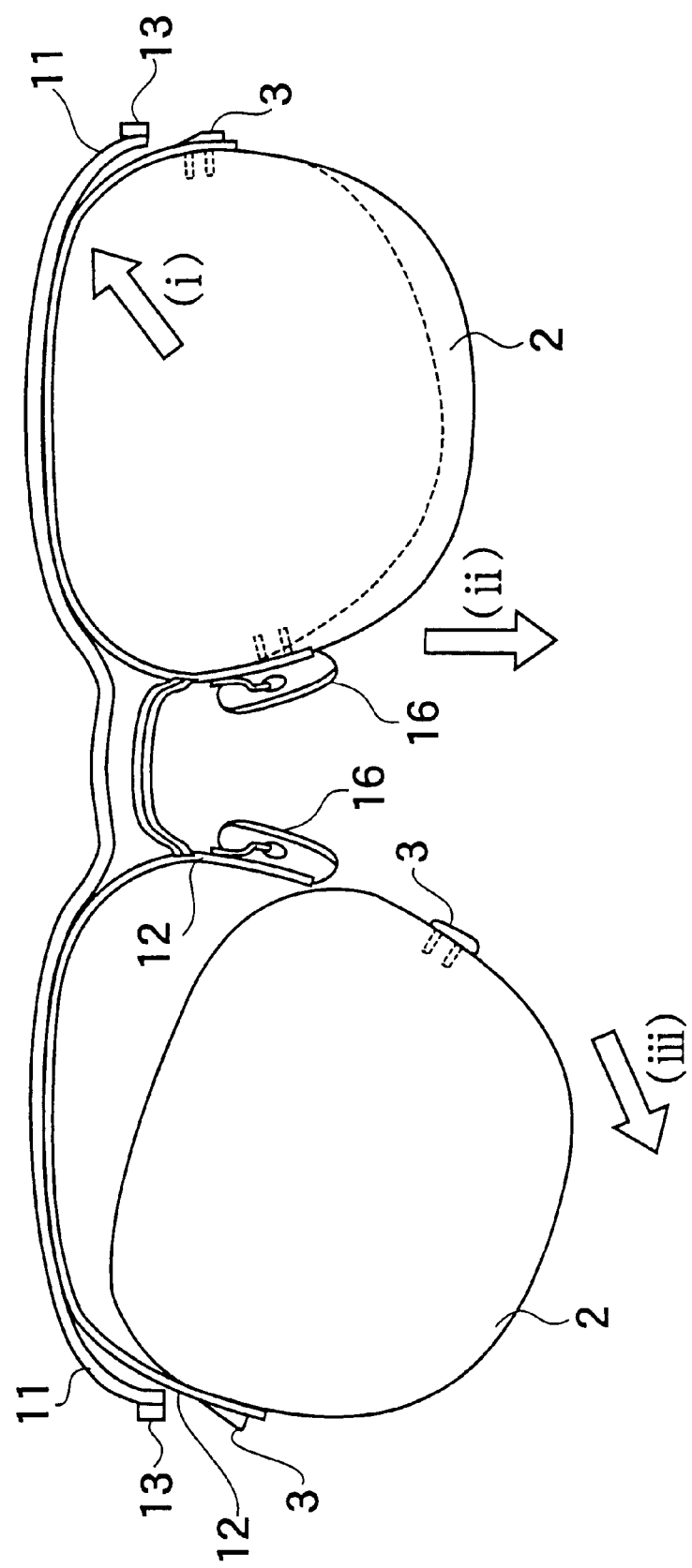
FIG. 15 is ai illustration of a lens replacement procedure.

FIG. 14 and FIG. 15 are illustration of lens replacement procedure. As shown in FIG. 14, when mounting a lens 2, the procedure is carried out by, first, grasping the frame by finger in the vicinity of the nose pad, fitting a lens-side-connecting member into the frame-side-connecting member 120 of lens-fastening bar 12 at the temple side, and, as indicated by Arrow (i) of the figure, forcing open lens-fastening bar 12 at the temple side, and next, as indicated by Arrow (ii) of the figure, fitting a lens-side-connecting member into the frame-side-connecting member 120, which is on the nose pad side.

Further, as shown in FIG. 15, when dismounting a lens 2, first, the frame is grasped by finger in the vicinity of the nose pad 16, the lens-fastening bar 12 is forced open at the temple side as indicated by Arrow (i) of the figure, and the lens-side-connecting member 3, which is fitted to the frame-side-connecting member 120 at the nose pad side, is disconnected as indicated by Arrows (ii), (iii) of the figure, thereafter, the lens-side-connecting member of the temple side is disconnected, and the lens is dismounted.

According to the aspects of the embodiment described hereinabove, because a lens is held in a frame by connecting lens-side-connecting members to frame-side-connecting members, various types of lenses can be surely held regardless of lens thickness, enabling these lenses to be replaced at will.

Further, because most of the operating points of force required to maintain a connection lie in the reciprocal connecting members, which are separate members from a lens, and the force acting directly on a lens is extremely small, there is no danger of a lens being damaged. Further, holding is also certain. Furthermore, since a lens-side-connecting member can be made extremely small, the size is practically the same as the size of the lens itself. Therefore, portability is excellent.

INDUSTRIAL APPLICABILITY

As explained hereinabove, the present invention is spectacles characterized in that it has a lens-side-connecting member, which is a connecting member for mounting a lens to a frame portion in a detachable condition, and is constituted from a member that is separate from a lens, and is mounted in a fixed condition to the edge portion of this lens, and a frame-side-connecting member, which is disposed in the above-mentioned frame portion for connecting in a detachable condition to a lens-side-connecting member, and mounting the above-mentioned lens to the above-mentioned frame portion in a detachable condition. In accordance therewith, there is achieved spectacles for which lens replacement is simple, replacement lens portability is excellent, and a lens can be mounted in a fastened condition to a frame with certainty without danger of the lens being damaged.

What is claimed is:

1. Spectacles accommodating at least one interchangeable/replaceable lens, the spectacles comprising:
   a frame portion;
   at least one lens mounted to the frame portion;
   at least one lens-side-connecting member for engaging and mounting a corresponding lens detachably to the frame portion, each lens-side-connecting member being separate from each lens and fixed to an edge portion of each lens; and
   at least one elastic frame-side-connecting member disposed on the frame portion and detachably connected to a corresponding lens-side-connecting member using elastic deformation for mounting a corresponding lens detachably to the frame portion.

2. The spectacles according to claim 1, wherein each lens-side-connecting member is mounted to a side face of an edge portion of a corresponding lens, and protrudes from the side face, and each frame-side-connecting member has a fitting portion into which a corresponding lens-side-connecting member is fitted detachably.

3. The spectacles according to claim 1, wherein a cavity portion is formed in a side face of an edge portion of each lens such that a portion of a corresponding lens-side-connecting member is fitted and fixed in the cavity portion, and each lens-side-connecting member has a protruding portion for fitting into the cavity portion provided in the edge portion of each lens.

4. The spectacles according to claim 3, wherein each lens-side-connecting member is bonded and fixed with the protruding portion thereof being fitted into the cavity portion provided in the side face of the edge portion of the corresponding lens.

5. The spectacles according to claim 1, wherein each lens-side-connecting member is fastened to an edge portion of a corresponding lens by a mechanical fastener.

6. The spectacles according to claim 5, wherein the mechanical fastener comprises a screw passing through the edge portion of the corresponding lens and a portion of the corresponding lens-side-connecting member, and a nut for fastening the corresponding lens-side-connecting member to the edge portion of the corresponding lens by being screwed onto the screw.

7. The spectacles according to claim 1, wherein the frame portion further comprises:
   a front bar having left and right temples mounted to left and right ends thereof, respectively; and
   a lens-fastening bar to which left and right lenses are attached in a replaceable condition;
   the lens-fastening bar being fixed to the front bar.

8. The spectacles according to claim 7, wherein the lens-fastening bar is provided with a fitting portion to which a corresponding lens-side-connecting member is fitted detachably.

9. The spectacles according to claim 8, wherein the lens-fastening bar is composed of a member having elasticity, has contours conforming to the side face of the edge portion of the corresponding lens, and clasps the side face of the edge portion of the corresponding lens by elastic force from an opposing side.

* * * * *